United States Patent [19]

Thompson

[11] Patent Number: 4,748,448

[45] Date of Patent: May 31, 1988

[54] REMOTE SENSING APPARATUS FOR SATELLITES

[75] Inventor: Alan Thompson, Ryde, United Kingdom

[73] Assignee: Agence Spatiale Europeenne, France

[21] Appl. No.: 508,541

[22] Filed: Jun. 28, 1983

[30] Foreign Application Priority Data

Jun. 29, 1982 [FR] France .................................. 82 11447

[51] Int. Cl.⁴ .......................... G01S 13/84; G01S 13/95
[52] U.S. Cl. .......................................... 342/26; 342/175
[58] Field of Search .......................... 343/5 W, 5 CM;
    73/170 R; 342/25, 26, 82, 83, 85, 175, 352, 356

[56] References Cited

U.S. PATENT DOCUMENTS 4,509,048  4/1985  Jain .................................. 343/5 WX

OTHER PUBLICATIONS

*Radar Handbook*, Merrill I. Skolnik, McGraw Hill, 1970, Chapter 32, pp. 17–26.
Introduction to Radar Systems, Skolnik, Merrill I, 1980, pp. 298–305, McGraw Hill.
Grantham et al. "The Seasat-A Satellite Scatterometer", Apr. 1977, IEEE Journal of Oceanic Engineering, vol. OE-2, No. 2, pp. 201–206.
Tomiyasu K. "Conceptual Performance of a Satellite Borne, Wide Swath Synthetic Aperture Radar" IEEE (Apr. 1981) vol. GE-19, No. 2, pp. 108–116.

*Primary Examiner*—Thomas H. Tarcza
*Assistant Examiner*—Mark Hellner
*Attorney, Agent, or Firm*—Andrus, Sceales, Starke & Sawall

[57] ABSTRACT

The invention relates to remote sensing from a satellite of a parameter in one or more regions on the ground adjacent the satellite ground track by radar transmission. The purpose of the invention is to reduce energy consumption and optimize measurement accuracy. A transmitter antenna generates a plurality of pencil radar beams which illuminate respective cells of the region. A control means successively energizes the antenna at respective frequencies for respective pulse durations and for respective number of pulses. The invention is particularly appliable to scatterometer apparatus for responding to wind speed and direction by sensing radar backscatter from sea.

9 Claims, 6 Drawing Sheets

| CELL NUMBER | PULSES | | NUMBER OF PULSES Lp | NUMBER OF SAMPLES Lr | TOTAL DURATION OF PULSES μs | % |
|---|---|---|---|---|---|---|
| | GHz | μs | | | | |
| 1 | 14.000 | 6.262 | 17 | 12 | 106.45 | 0.43 |
| 2 | 13.883 | 10.92 | 25 | 8 | 273.00 | 1.11 |
| 3 | 13.777 | 20.407 | 50 | 4 | 1020.35 | 4.15 |
| 4 | 13.682 | 29.796 | 67 | 3 | 1996.33 | 8.12 |
| 5 | 13.598 | 40.002 | 100 | 2 | 4000.20 | 16.27 |
| 6 | 13.524 | 49.435 | 100 | 2 | 4943.50 | 20.11 |
| 7 | 13.458 | 58.12 | 100 | 2 | 5812.00 | 23.65 |
| 8 | 13.400 | 64.273 | 100 | 2 | 6427.30 | 26.15 |
| | | 279.22 | | | 24579.13 | |

REMOTE SENSING APPARATUS FOR SATELLITES

BACKGROUND OF THE INVENTION

The present invention relates to reduced energy consumption remote sensing from a satellite. The invention is applicable to improving the energy requirements of satellites particularly in the case of a scatterometer, that is to say apparatus for sensing radar back-scatter, which can be used to sense remotely the speed and direction of wind at the surface of the sea and, by way of example, the invention will be described with reference to such an application.

Figure 1:
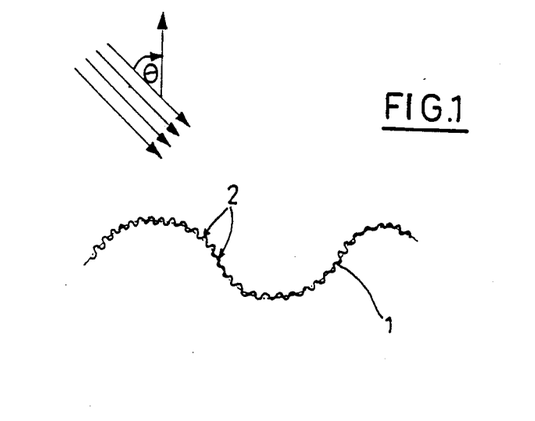
FIG. 1 is a schematic view of a sea-wave illuminated by a radar-beam.

A wind measuring apparatus of this kind utilizes a radar system and is based on measurement of the microwave back-scatter coefficient of the surface of the water at sea. In fact, it has been found that gravity waves, that is the swell of the sea, are very little dependent on the wind, whereas capillary waves that is to say very small waves which "ripple" the surface of the sea, depend closely on the wind. In the accompanying drawings, FIG. 1 is a diagrammatic view of a gravity wave 1 which is "modulated" by capillary waves 2. The wave length of the gravity waves is much bigger than that of radar transmissions, while capillary waves, on the contrary, have wave-lengths comparable with radar and there is an interaction between the capillary waves and the radar signal. For angles of incidence $\theta$ greater than 25°, the Bragg condition is fulfilled and the radar echo of the ocean is essentially a function of the frequency spectrum of the ocean. The back-scatter coefficient $\sigma^\circ$ is a function of the speed and the direction of the wind.

It is therefore possible to determine the speed and the direction of the wind at the surface of the ocean from a satellite. Accordingly, scatterometers have been mounted on satellite platforms in order to measure the wind velocity. Such apparatus is described in the publication "IEEE Journal of Oceanic Engineering" Volume OE-S No. 2 (April 1980) pages 138 to 154. They comprise a "fan" antenna having a beam which is wide in elevation and narrow in azimuth. The receiver includes a doppler filter which defines measurement cells corresponding to quadrangular scans of the ocean strip illuminated by the radar beam. For reasons of efficiency, the angle of incidence is limited to 55°, which corresponds to the most remote measurement cell from the satellite.

Figure 2:
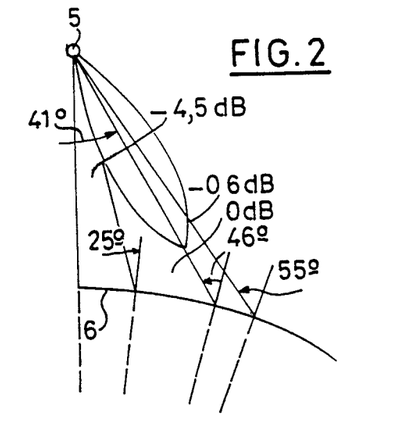
FIG. 2 is a diagrammatic view showing the general principles of a remote sensing satellite and its radar transmission pattern.
Figure 3:
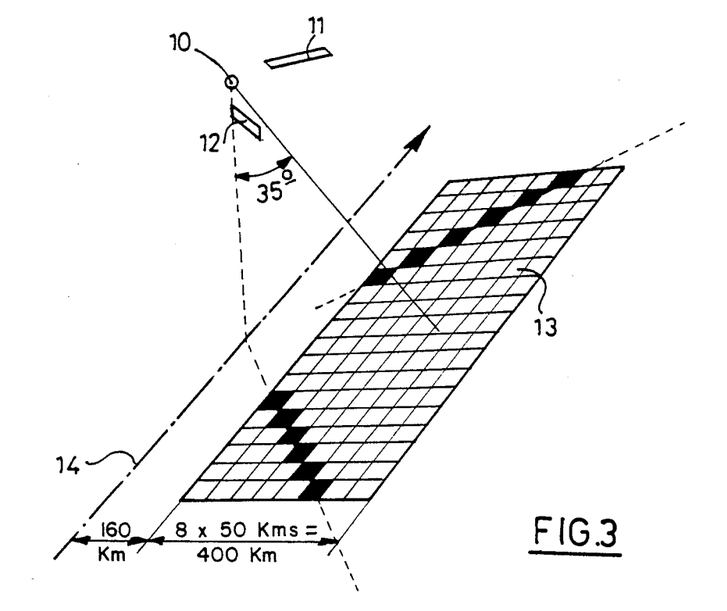
FIG. 3 is a diagram of the sensing pattern of the satellite of FIG. 2.

FIG. 2 of the accompanying drawings shows a satellite 5, measuring wind characteristics for angles of incidence $\theta$ with the ground ranging from 25° (closest cell) to 55° (furthest cell). Thus, with eight measurement cells, the speed and direction of the wind can be measured over a width of 400 Km, each cell being a square of side 50 Km. This is illustrated in FIG. 3 where a satellite 10 is shown having two antennas, one forwards 11, and one rearwards 12, whose beam outline on the measurement strip of ocean 13 is 400 Km wide (8×50 Km). The broken line 14 indicates the satellite ground track and the beam of each antenna makes an angle of 45° with the direction of movement of the satellite.

The prior art scatterometers for wind measurement on board satellites have a certain number of disadvantages.

The transmission requirements are calculated for the worst case, that is to say to obtain a satisfactory measurement for the most remote cell. However, since the backscatter coefficient is much higher for the smaller angles of incidence which correspond to the closest cells, the return signal is about 100 times larger than that needed to satisfy the measurement accuracy requirements. For close cells there is an overabundance of energy which leads to energy wastage. This is particularly troublesome for an onboard apparatus where all means of reducing consumption are required to increase the life-time of the flight.

OBJECT OF THE INVENTION

An object of the invention is to provide a remote sensing apparatus of the kind referred to in which the energy consumption and measurement accuracy are optimized.

SUMMARY OF THE INVENTION

The present invention provides a remote sensing apparatus for use in a satellite for remotely sensing a parameter in at least one region adjacent to the satellite ground track, comprising transmitter-receiver means comprising antenna means for illuminating said region with an electromagnetic beam and receiving an echo therefrom, wherein said antenna means comprises a plurality of frequency scanning antenna elements for illuminating respective cells in said region and said transmitter-receiver means includes a control means for successively energizing said antenna means at respective frequencies respective pulse durations and for respective numbers of pulses.

Since the antenna means is energized successively, and with distinct frequencies, the individual transmitted signals can be regulated to obtain the optimum conditions for each cell. Accordingly, the energy consumption can be considerably reduced while maintaining or improving accuracy.

Advantageously, said control means is arranged to energize said antenna means at substantially the same peak transmission power with pulse trains having respective pulse lengths.

The fact that each pulse length and the number of pulses are controlled accordingly controls the average transmitted power for a given cell.

BRIEF DESCRIPTION OF THE DRAWINGS

Other features and advantages of the invention will appear from the following description, given by way of non-limitative example and with reference to the accompanying drawings, in which.

DESCRIPTION OF THE PREFERRED EMBODIMENT

Figure 4:
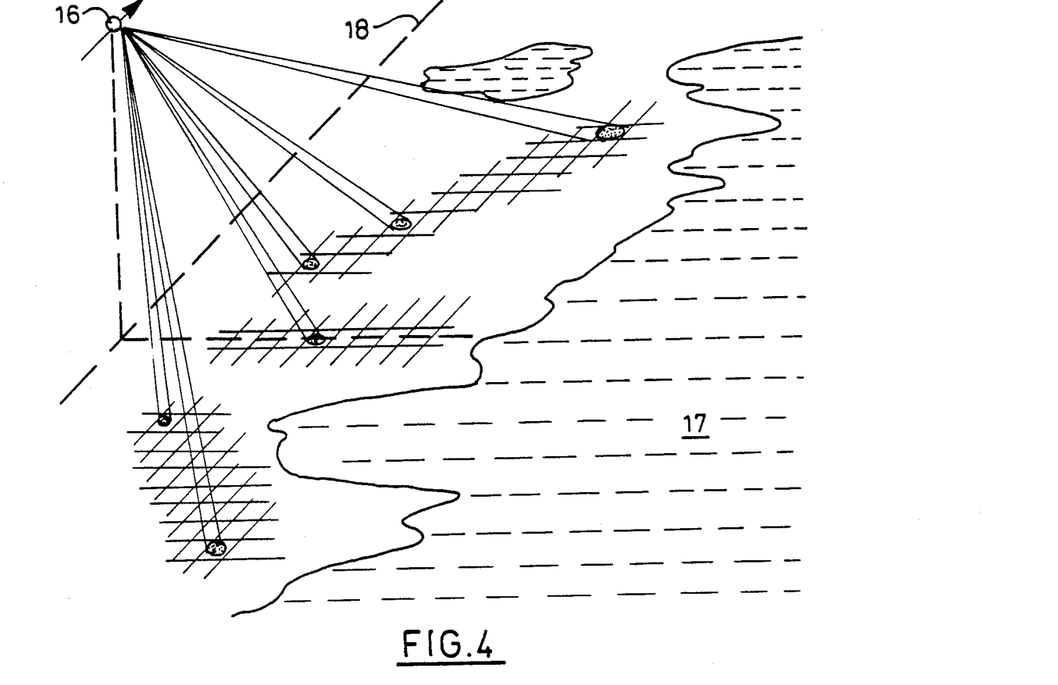
FIG. 4 is a diagrammatic view of a remote sensing satellite in accordance with the invention.

The satellite shown in FIG. 4 of the drawings sends consecutive signals to each measurement cell instead of sending a signal simultaneously to all the cells of the azimuth strip covered by the fan antenna as in prior art scatterometers. The scatterometer shown in FIG. 4 of the drawings uses pencil beam antennas, performing a frequency scan.

Figure 4A:
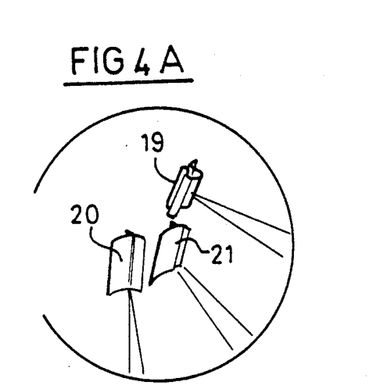
FIG. 4A is a diagrammatic view of a detail of the satellite of FIG. 4.

FIGS. 4 and 4A show a general view of a preferred embodiment of the invention. This embodiment comprises a satellite 16 in orbit about the earth 17. The line 18 represents the satellite ground track, that is to say the line vertically below the satellite orbit. The satellite carries three transmitting antennas, a forward antenna 19, a rearward antenna 20 and a 90° antenna 21. The antennas 19 and 20 are pointed at azimuth angles of 45° and 135° respectively, to the satellite ground track 18. A pulse is sent in succession to each of the cells, such as as a cell K, with a frequency $F_k$ and a duration $\tau_k$. The peak power of the pulses is the same for all the cells and a duration $\tau_k$ is defined for each cell so as to obtain the best measurement conditions.

The measurement quality is related to a factor $K_p$ which represents the normalized standard deviation of the backscattered power measurement. The lower the value of $K_p$, the better the measurement performance. Thus to obtain an accuracy of 20° for wind direction with a high probability of accuracy, the factor $K_p$ should not be more than 20%. The factor $K_p$ is given by the equation:

$$K_p = \frac{1}{L}\left(1 + \frac{1}{S_n}\right)$$

Where L is the number of independent samples and $S_n$ the signal-to-noise ratio. The factor $K_p$ varies especially as a function of the beam incidence angle.

In this embodiment of the invention, the factor $K_p$ can be influenced by choosing for each cell the number of samples L; that is to say the number of pulses sent to each cell is defined so as to obtain, for example, an identical factor $K_p$ for each cell thus giving uniform measurement performance.

Figure 5:
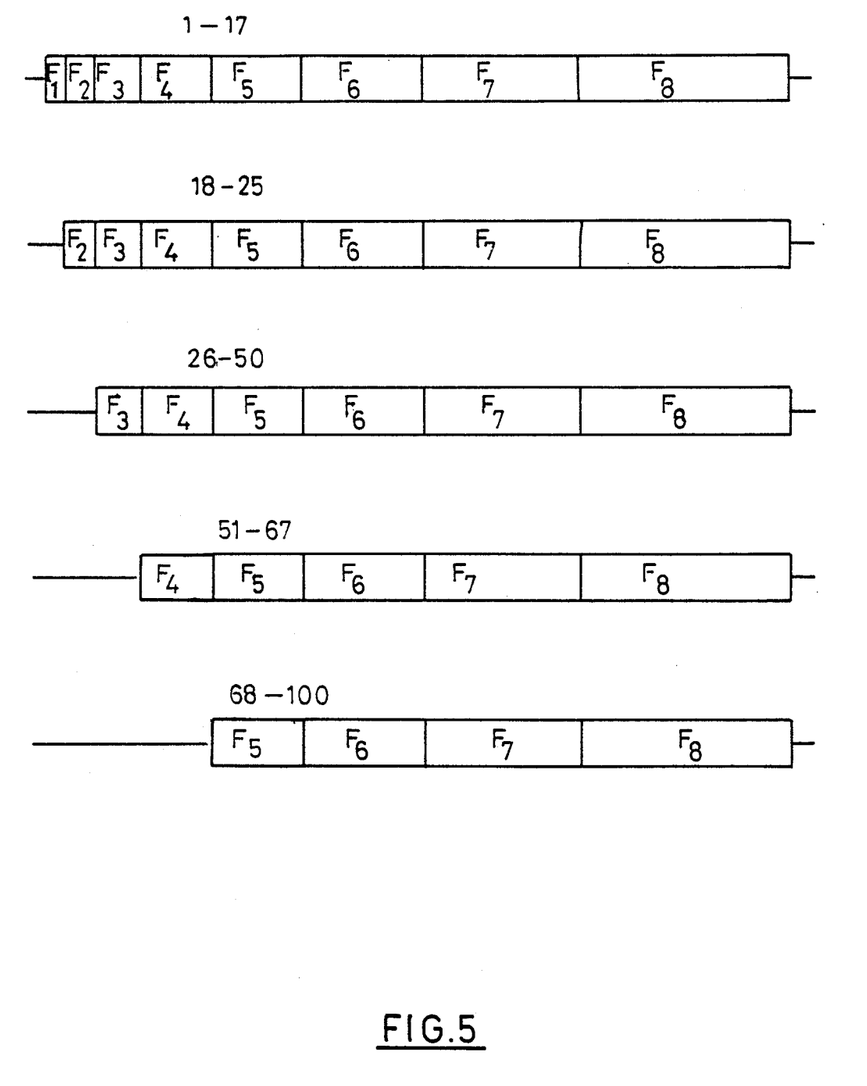
FIG. 5 is a table depicting pulse trains transmitted by the satellite of FIG. 4.

FIG. 5 gives an example of a possible measurement sequence in the case of 8 cells, the cell 1 being the closest (angle of incidence $\theta$ equal to 25°) and 8 the most remote (angle of incidence $\theta$ equal to 55°).

It will be seen that a complete measurement cycle comprises 100 pulse trains. The pulse trains 1 to 17 illuminate all the cells. The next eight pulse trains 18 to 25 illuminate only cells 2 to 8, the next 25 trains only cells 3 to 8 and so on.

Figure 6:
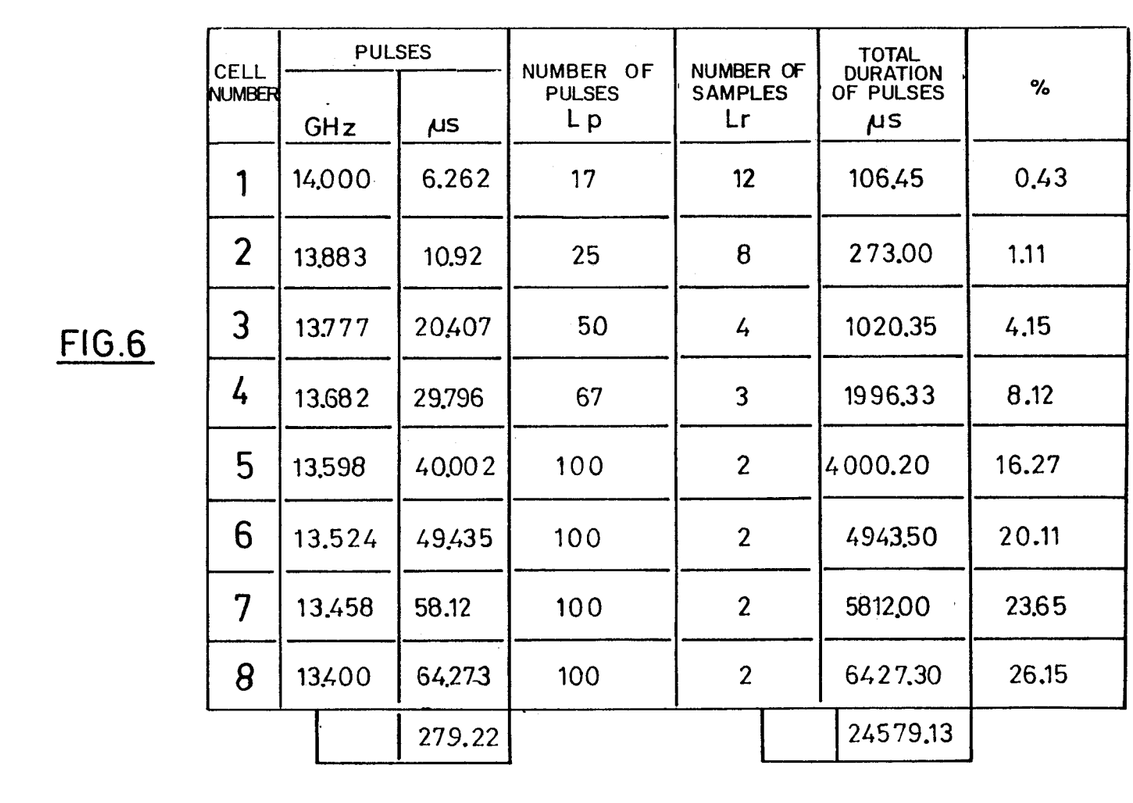
FIG. 6 is a table of parameters of the pulse trains of FIG. 5.

FIG. 6 is a table indicating for each cell, the frequency, duration and number $L_p$ of transmitted pulses, the number $L_r$ of samples per pulse, the aggregate duration of the pulses and the proportion of this aggregate duration to the overall duration of transmission in each cycle.

It will be seen that the closest cells receive the shortest and fewest pulses and, for this reason the aggregate duration of transmission for cell 1 is much less than for cell 8. It will be understood that, in this situation, good measurement conditions are obtained for all cells while sending to each cell only the strict minimum of energy.

The time interval between two pulse trains must be defined to take account of the following factors:
the decorrelation time of the target scene,
the avoidance of transmission while attempting to receive and,
the average power capability of the transmitter.

An interval of 7.5 ms satisfies the first two conditions and a complete cycle can then be transmitted in 750 ms approximately. For a peak power of 2000 W, the maximum average power required from the transmitter is then 74 W.

Each time, the satellite traverses approximately 50 km (that is to say every 7.46 seconds) a cycle of pulses is sent. It follows that the radio frequency average power is approximately 6.6 W per antenna. In fact, the 90° antenna needs less power. If a six antenna system is used, with three antennas on each side of the satellite for azimuths of 45°, 90°, 135°, 225°, 270° and 315°, a region of width of 1200 km can be scanned with an average total power of 39.6 W.

This result may be compared with those obtained from prior art apparatus, where the power necessary to obtain the same measurement accuracy is much higher. This is particularly important for apparatus on board a satellite platform.

The azimuth dimension of the antennas is chosen so as to limit the beam width to that necessary to illuminate the furthest cell.

Figure 8:
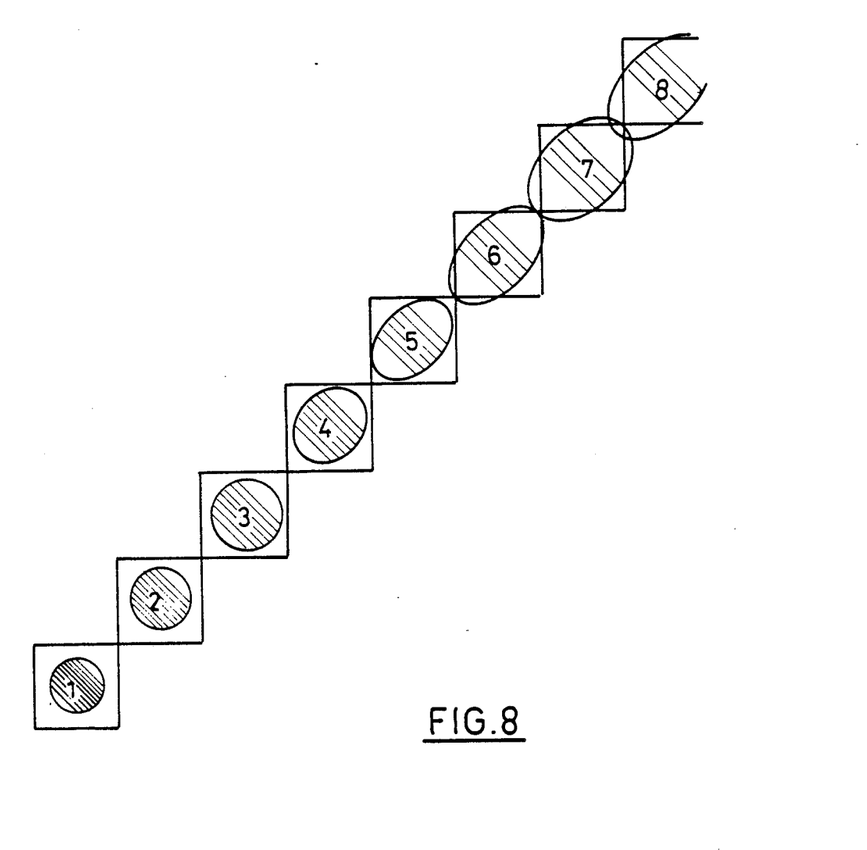
FIG. 8 is a diagram of the outline on the ocean of the beams transmitted by the satellite of FIG. 4.

Because the apparatus scans the cells one after the other, the range resolution makes it unnecessary to limit the beam height to that of the cell. However, to reduce energy consumption, a pencil beam is used, whose aperture is square or close to square. The beam section is preferably limited so that its outline is inscribed within each measurement cell as shown in FIG. 8, where the beam outlines are shown on the measurement cells.

The frequency of the pulses for each cell is in the P-band: 14 GHz.

The frequency for each cell is a function, for example a linear function, of the scan angle of the beam. From the table of FIG. 6, it will be seen that the frequency varies from 14 GHz for cell 1 to 13.4 GHz for cell 8.

The main characteristics of the apparatus described in this example are as follows:
orbit height: 675 km
measurement band width: 400 km, the nearest edge being offset by 200 km from the satellite ground track 18 on the ground.
measurement cell pattern; squares of side 50 km
azimuth and elevation antenna dimensions 58 cm,
scan angle: 23°,
polarization: vertical
peak R.F. power output: 2000 W,
receiver noise factor: 4 dB,
total losses: 12.7 dB (including 3 dB margin),
$K_p$ factor: 15% for each cell,
scatter coefficient $\sigma°$ corresponding to a 4 m/s cross wind.

As seen in the table of FIG. 6, several samples may be obtained per pulse, in this example ranging from twelve for cell 1 to two for cell 8. The number of independent measurements is equal to the product of the number of pulses $L_p$ multiplied by the number of samples $L_r$. In this example, the integration length for each sample has been limited to 12.5 km on each side of the center of each cell as shown in FIG. 8.

Figure 7:
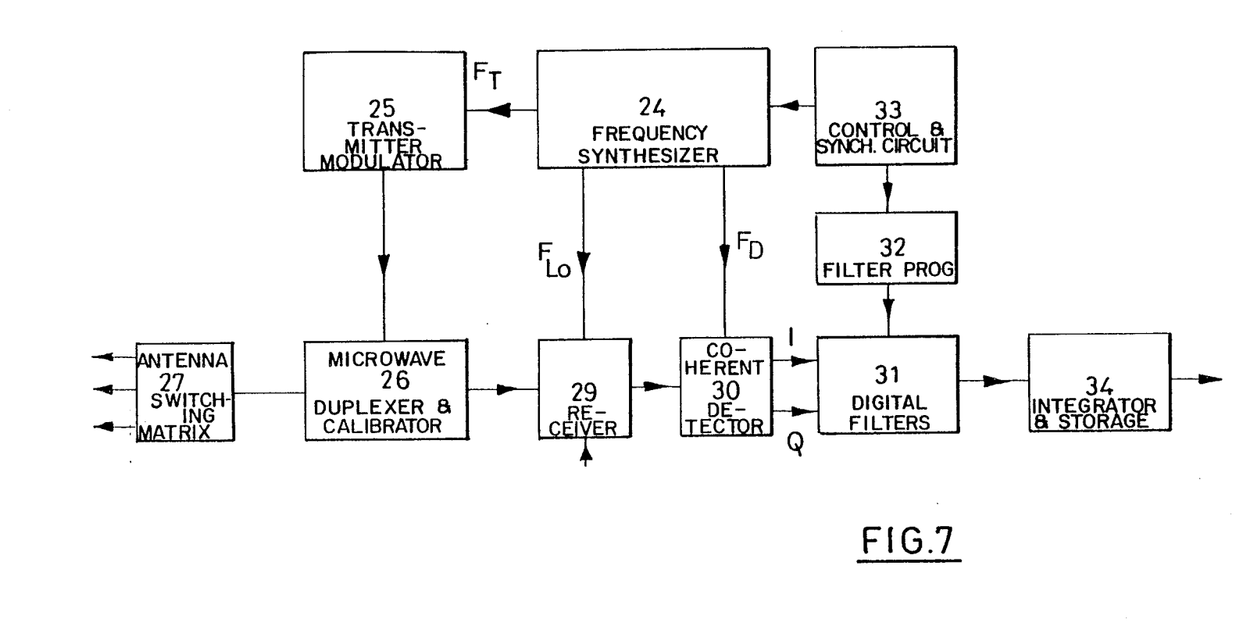
FIG. 7 is a block schematic diagram of a scatterometer in the satellite of FIG. 4.

FIG. 7 is a block schematic diagram of this embodiment of the invention. It comprises a frequency synthesizer 24, which supplies a suitable wave shape with frequency steps during the pulse train. The signal $F_t$ obtained is sent to a transmitter modulator 25 and then to a microwave duplexing and calibrating unit 26 and finally to an antenna switching matrix 27 which directs the signal to the appropriate frequency scanning antenna.

On reception, the signal is mixed in the receiver 29 with a local signal $F_{Lo}$ supplied by the frequency synthesizer 24, which changes in frequency during the reception phase.

The output signal from the receiver is sent to a coherent detector 30 which also receives from the synthesizer 24 a signal $F_D$ whose frequency is changed in synchronism with the local frequency $F_{Lo}$ so as to compensate the doppler shift. The signal obtained is sent to a digital filter 31, controlled by a filter programmer 32, itself triggered by a control and synchronization unit 33 which also controls the synthesizer 24.

The signal processed by the filters is sent to the integrators and storage indicated diagrammatically at 34. In the absence of a signal, noise is processed as described above to allow noise to be subsequently subtracted from the noisy signal. The data obtained is then processed by a computer so as to obtain the back scatter coefficients, and hence the wind parameters at the surface of each cell.

It is seen that the invention enables homogeneous measurement performance to be obtained while using only the energy which is strictly necessary. It offers considerable flexibility, which enables the measurements to be adapted to a desired model for interpretation of backscatter, even while the satellite is in orbit.

The measurements can also be adapted to different measurement scenes, which may for example be partially or totally covered by earth, ice or water or a combination of these. In prior art apparatus, the whole scene is illuminated at the same time so that, if part of the scene is earth or ice, the radar response is very difficult to analyze, without resorting to a complex filtering system. This embodiment of the invention enables the echoes of different cells to be analyzed to determine which relate to earth, to ice or to water. Pulses need only be sent to cells from which a response is desired, with the advantage of saving energy.

Another possibility of this embodiment is adaptation to a measured or expected field of the backscatter coefficient $\sigma°$. In prior systems, the whole scene is illuminated with a signal which can measure the wind to the desired accuracy in the worst case (4 m/s). However, this wind seldom occurs and energy is therefore wasted. In the scatterometer of this embodiment of the invention, after a first group of pulses is analyzed, a profile for $\sigma°$ can be established and subsequent pulse trains adapted to suit this profile.

The embodiment of the invention described above has been given only by way of example and modifications and variants may be made without departing from the scope of the invention. For example, the invention may also be applied to a synthetic aperture radar (SAR) which is capable of giving very selectively an image of parts of a wide scan. The suppression of the bilateral lobe (which is approximately 50 dB) of the pencil beam suppresses range ambiguities and this enables good azimuth resolution to be obtained. The spectrum associated with the frequency scanning antenna gives a weighting which automatically reduces the range side lobes associated with pulse compression. This system would enable a relatively narrow sweep to be positioned within a large range of angles of incidence. In this way, the demands of all users concerned in remote sensing could be satisfied. Additional scans could be added by increasing the band provided for the frequency scan provided obviously, that transmitter power is enough. The system also enables orthogonal views to be taken.

In addition, scanning the cells in succession with changing frequency can be performed with any suitable type of antenna and the echo signal received can be treated by means of a battery of receiver filters provided with individual integrators and storage.

What is claimed is:

1. Remote sensing apparatus for use on board a satellite for sensing the differing values of a variable geophysical parameter in a plurality of measurement cells definable in at least one elongated region of the surface of the earth adjacent to the satellite ground track, said variable parameter altering the back-scatter coefficient of radar signal echos, said apparatus comprising: transmitter-receiver means for illuminating said region with radar signals and receiving echos therefrom, said transmitter-receiver means including at least one frequency scanning antenna means, said transmitter-receiver means including control means for energizing said antenna means to transmit a succession of radar beams, each of said radar beams being transmitted at a predetermined angle of incidence to the earth's surface and illuminating a cell in said region, each of said radar beams having a predetermined frequency and transmission power output selected in accordance with the transmission angle of incidence, said control means energizing said antenna means at substantially the same transmission power for time periods of differing lengths, thereby to control the transmission power output of said antenna means for each of said radar beams, and said transmitter-receiver means including signal processing means coupled to said antenna means for obtaining back-scatter coefficient properties of the radar signal echos and the values of the variable geophysical parameter.

2. Apparatus according to claim 1 wherein said antenna means illuminates a cell remote from the ground track at a large angle of incidence and illuminates at least one cell closer to the ground track at a small angle of incidence and wherein said control means is further defined as means for energizing said antenna means at substantially the same transmission power for time periods of greater length for said remote cell than for the closer cell, thereby to control the transmission power output and to obtain a substantially uniform measurement performance for each cell.

3. Apparatus according to claim 2 wherein said antenna means illuminates a cell remote from the ground track at a large angle of incidence and illuminates at least one cell closer to the ground track at a smaller angle of incidence and wherein said control means is further defined as means for energizing said antenna means at substantially the same transmission power with pulse trains having a greater number of pulses for said remote cell than for the closer cell.

4. Apparatus according to claim 2 wherein said control means is further defined as means for energizing said antenna means in a plurality of cycles, said antenna means being successively energized for differing portions of each of said cycles for controlling the transmitting time periods of said antenna means.

5. Apparatus according to claim 1 wherein said antenna means illuminates a cell remote from the ground track at a large angle of incidence and illuminates at least one cell closer to the ground track at a smaller angle of incidence and wherein said control means establishes a higher transmission frequency for the closer cell than for the remote cell.

6. Apparatus according to claim 1 wherein said antenna means illuminates a cell remote from the ground track at a large angle of incidence and illuminates at least one cell closer to the ground track at a smaller angle of incidence and wherein said receiver-transmitter means is further defined as obtaining a greater number of measurement samples from the closer cell than from the remote cell.

7. Apparatus according to claim 1 wherein said antenna means illuminates respective cells arranged transversely to the satellite ground track.

8. Apparatus according to claim 1 wherein said antenna means produces a pencil radar beam for illuminating an area comparable in shape and size to a measurement cell.

9. Apparatus according to claim 1 wherein said control means establishes a transmission frequency such that said back-scatter property is representative of a wind based parameter.

* * * * *

UNITED STATES PATENT AND TRADEMARK OFFICE
CERTIFICATE OF CORRECTION

PATENT NO. : 4,748,448

DATED : May 31, 1988

INVENTOR(S) : Alan Thompson

It is certified that error appears in the above-identified patent and that said Letters Patent is hereby corrected as shown below:

Column 3, line 35 delete "$K_p = \frac{1}{L} \; 1 + \frac{1}{S_n}$" and substitute therefor ---$K_p = \frac{1}{\overline{VL}} \left(1 + \frac{1}{S_n}\right)$---

Signed and Sealed this

Fourth Day of June, 1991

Attest:

HARRY F. MANBECK, JR.

Attesting Officer

Commissioner of Patents and Trademarks